United States Patent
Uhl et al.

[15] 3,668,115
[45] June 6, 1972

[54] PROCESS FOR CHARGING CATALYST

[72] Inventors: George A. Uhl, Markham; Lloyd A. Baillie, Homewood, both of Ill.

[73] Assignee: Atlantic Richfield Company, Philadelphia, Pa.

[22] Filed: Mar. 27, 1970

[21] Appl. No.: 23,489

[52] U.S. Cl. ..............................208/143, 208/146, 208/152, 214/17 C, 214/152, 23/1 E
[51] Int. Cl. ..........................................................C10g 23/02
[58] Field of Search .........................208/146, 152, 167, 143; 214/17 C, 152; 23/1 E

[56] References Cited

UNITED STATES PATENTS

| 2,952,622 | 9/1960 | McClure | 208/167 |
| 3,203,891 | 8/1965 | Holden | 208/143 |

*Primary Examiner*—Herbert Levine
*Attorney*—Robert J. Mawhinney and Thomas J. Clough

[57] ABSTRACT

An improved process for charging a solid catalyst, such as an extruded catalyst, to a fixed bed reactor by charging the catalyst at a rate of fill of the reactor of up to about 17 inches per minute and in a manner such that the average orientation of catalyst particle lengths in the catalyst bed is substantially horizontal.

24 Claims, No Drawings

PROCESS FOR CHARGING CATALYST

This invention relates to a process for charging a solid catalyst to a reactor and, more particularly, to a catalyst charging process which provides for increased catalyst efficiency.

In the past, catalyst has been charged by what is commonly referred to as the "sock" method. In this method, a hopper having an attached hose which extends to the bottom of the reactor or catalyst surface is utilized. The hopper and hose are charged with catalyst and the catalyst is released at the bottom of the hose by raising the hose slowly. The resulting catalyst bed develops a cone which, during the loading of the catalyst, can be distributed over the catalyst bed by raking. Commercial reactors varying in width from about 1 foot to about 15 feet, having lengths of from about 5 feet to 70 feet, are loaded by this "sock" technique. One of the problems that is associated with loading reactors by this method is that the catalyst bed can contain catalyst voids which can, during the use of the catalyst, bring about catalyst settling problems, localized hot spots caused during the exothermic reactions of reactants, and the necessity to utilize increased reactor volume. In addition, the "sock" technique requires increased times for loading a reactor since the hose through which the catalyst enters the reactor has to be continually adjusted upwardly in order to allow catalyst to flow. In addition to the above method, catalyst can be continually added through a hopper which also results in the formation of a cone on the catalyst bed. As in the above method, the catalyst cone can be distributed over the catalyst bed by raking.

Thus, the settling of catalyst can change the overall volume of the catalyst bed thereby producing damage to equipment such as thermowells which have been inserted into the reactor for temperature measurements. In addition, the settling of catalyst can reduce the surface of the catalyst bed to a level whereby the thermowell is not in contact with the catalyst, thereby not allowing the reaction temperature to be monitored during the course of a reaction. The problem associated with hot spots, which are primarily caused by the maldistribution of liquid flow during exothermic reactions, is that reactions take place under non-uniform temperature conditions thereby producing undesirable side reactions and products.

An additional problem associated with the prior art method of charging catalyst is that for a given reactor volume the amount of catalyst which can be charged is determined by the final catalyst density. Thus, a means for increasing the bulk density of catalyst present would allow for increased throughput of reactants at the same space velocity or the same throughput at lower space velocities. Thus, more severe reaction conditions and increased throughput can be obtained for a given volume of catalyst if the maximum bulk density of the catalyst can be achieved.

It is, therefore, an object of this invention to increase catalyst utilization in fixed bed reactors.

It has now been found that increased catalyst utilization and liquid distribution is improved and bulk density per volume of a reactor is increased by a process for charging catalyst to a reactor which comprises charging to the reactor in downflow relationship to said reactor, solid catalyst particles having a substantially cylindrical geometry on an average basis at a rate of fill of the reactor of up to about 17 vertical inches per minute, and at an average free fall distance of the catalyst particles through a gaseous medium to catalyst surface of at least about 1 foot, and distributing the catalyst particles over the catalyst surface in a substantially horizontal orientation.

More particularly, it has been found that a substantial improvement in bulk density approaching the maximum bulk density of the catalyst is obtained by the process of this invention. In addition, the increase in bulk density produces a rigid catalyst bed with a substantially reduced tendency toward settling. The process of this invention provides also for an orientation of catalyst particles which substantially approach horizontal orientation, thereby providing for improved distribution of liquid flow and horizontal mixing. Of additional importance is the fact that the process of this invention provides for the preparation of a catalyst bed with minimum formation of catalyst fines. Thus, the formation of catalyst fines is in general below 1 percent based on the total volume of catalyst charged and generally below 0.50 percent by volume.

In addition to the above, a method is provided for increasing the bulk density of catalyst per unit volume of reactor by charging catalyst according to the process set forth above. A particular advantage for the use of catalyst charged according to the process of this invention is in hydrogenation processes. More particularly, the utilization of this catalyst charging process provides for an improved hydrogenation process wherein a hydrogenation catalyst is charged to a reactor according to the process of this invention, hydrogen and hydrogenateable organic material are contacted with said hydrogenation catalyst and a hydrogenated organic material is recovered. Thus, the hydrogenation process of this invention provides for allowing more throughput at the same weight hourly space velocity and for greater catalyst weight per volume of reactor. The increase in catalyst density, therefore, allows for the construction and use of smaller and less expensive reactors for a given throughput.

In carrying out the process of this invention, catalyst is charged to a reactor in downflow relationship to said reactor. In general, reactor sizes varying between about 1 to about 15 feet, preferably from about 3 to about 13 feet in diameter, and from about 5 to about 125 feet, more preferably from about 10 to about 70 feet in length can be charged by the process of this invention. The catalyst is charged to the reactor at a rate of fill of the reactor of up to about 17 verticle inches per minute, more preferably from about 1 to about 6 and still more preferably from about 2 to about 4 inches per minute. The rate of fill of the reactor can be non-uniform, that is, the rate of fill can vary within the above range. It is preferred, however, that the rate of fill be uniform and that after a given rate of fill is established, that this rate of fill be maintained while preparing the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably an average free fall distance of from about 5 to about 125 feet and still more preferably from about 10 to about 70 feet. The gaseous medium in general is air, or depending on the catalyst, an inert medium such as nitrogen. In general the minimum free fall distance provides for a downward velocity sufficient to orient the catalyst particle along the major axis of the catalyst particle, that is the free fall distance should be sufficient to provide for the catalyst particle to move a slight vertical distance upwardly after contact with the catalyst surface in order to accomplish the orientation. Thus, in general, the catalyst particles fall individually to the catalyst surface as the catalyst bed is formed. The orientation of the catalyst particle produced in this manner provides for the substantially horizontal orientation of the catalyst particles on an average basis. The use of the phrase "substantially horizontal orientation on an average basis" means that the most probable orientation of the longitudinal axis of catalyst particles is horizontal. In addition, catalyst particles having a substantially horizontal orientation are defined herein to provide a catalyst surface which has a difference between the highest portion of the catalyst surface and the lowest portion of the catalyst surface which is less than 10 percent of the diameter of the catalyst bed, that is a substantially flat surface more preferably less than 5 percent and still more preferably less than 1 percent.

The above rates of fill, free fall distance and horizontal orientation of the catalyst within the above preferred ranges are preferred since they provide for substantially complete horizontal orientation of the catalyst particles while approaching substantially the maximum bulk density achievable for a given catalyst bed. The reactor sizes which are preferred are those reactors which, in general, are utilized in commercial processes such as hydrogenation, catalytic cracking and hydrocracking.

In general the process of this invention is applicable to catalyst particles which have a substantially cylindrical geometry and is particularly advantageous for extruded catalyst particles. In general, the particle diameter should not be greater than 3 percent of the reactor diameter and, in general, such catalyst particles have a particle diameter of from about one thirty-second to about one-fourth of an inch, more preferably from about one-sixteenth to about one-eighth of an inch with a length over diameter of the particles within the above particle diameters of from about 1.5 to about 6, more preferably from about 2 to about 5.

The catalyst can be charged to the reactor by a variety of means as long as the process parameters, as set forth above, are met. Thus, the catalyst particles can be added through a multiperforated disc which has the same area as the catalyst bed to be formed and which allows for catalyst particles to be distributed over the entire catalyst surface.

A preferred method for charging the catalyst to a reactor is to utilize a conventional hopper which, in essence, is an inverted cone which has an opening at the vertex of the cone. In order to have uniform distribution of the catalyst particles, a hollow conical diverter (e.g., a cone) is mounted in the hopper outlet. The verticle height of the conical diverter can be adjusted by adjusting means, such as a threaded rod through the center of the diverter and the hopper. The vertex of the conical diverter is centered in the hopper outlet. The vertical position of the conical diverter is adjusted to allow catalyst flow and thus regulates the amount of catalyst flow from 0 to varying rates of fill of the reactor. The conical diverter is a cone which, on the surface of the cone from a point below the hopper outlet to base, comprises a plurality of substantially equally spaced apertures varying in length from about 1 to about 20 inches and in width from about one-fourth to about 1 inch. In general, there are from about 4 to about 24 apertures on the surface of the conical diverter. The size of the conical diverter depends upon the size of the reactor which is being charged and, in general, has a length from the vertex to the base of from about 6 to about 18 inches and a diameter of the base of from about 6 to about 18 inches. The dimensions of the conical diverter and apertures are adjusted in order to provide for the flowing of catalyst from the hopper along the surface of the conical diverter to the base of the conical diverter and through he apertures at a rate to provide for uniform distribution of catalyst particles over the surface area of the reactor and catalyst surface which is being formed.

A wide variety of solid catalysts can be charged according to the process of this invention such as oxidation, hydrodesulfurization, hydrocracking, cracking, reforming and hydrogenation catalysts. Typical examples of hydrodesulfurization catalysts comprise any of the transitional metals, metal oxides, metal sulfides, or other metal salts which are known to catalyze hydrodesulfurization, and are not poisoned by hydrogen sulfide or other sulfur compounds. The preferred catalysts comprise the oxides and/or sulfides, as for example the oxides or sulfides of molybdenum, tungsten, iron, cobalt, nickel, chromium and the like. Vanadium compounds may also be employed in some cases. A particularly active combination consists of a group VIB metal oxide or sulfide with a group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate, which actually may be a mixture of cobalt and molybdenum oxides wherein the atomic ratio of Co to Mo may be between about 0.4 and 5.0. This catalyst, or any of the above catalysts may be employed in unsupported form, or alternatively it may be suspended on a suitable adsorbent oxide carrier such as alumina, silica zirconia, thoria, magnesia, titania, bauxide, acid-activated clays, or any combination of such materials.

Typical examples of hydrocracking catalyst are crystalline metallic alumino-silicate zeolite, having a platinum group metal (e.g., platinum or palladium) deposited thereon or composited therewith. These crystalline zeolites are characterized by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry of certain molecular structures. It has been found that crystalline aluminosilicate zeolites, having effective pore diameter of about 6 to 15, preferably 8 to 15 Angstrom units, when composited with the platinum group metal, and particularly after base exchange to reduce the alkali metal oxide (e.g., $Na_2O$) content of the zeolite to less than about 10 weight percent, are effective hydrocracking catalysts.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally, it is preferred that an oxide or sulfide of a Group VIII metal (particularly iron, cobalt, or nickel) be present in mixture with an oxide or sulfide or a Group VI-B metal (preferably molybdenum or tungsten). Suitable carriers or supports include acidic supports such as: silica-alumina, silica-magnesia, and other well-known cracking catalyst bases; the acidic clays; fluorided alumina; and mixtures of inorganic oxides, such as alumina, silica, zirconia, and titania, having sufficient acidic properties providing high cracking activity.

In addition, the various metals and metal oxides and sulfides can be utilized on a mixture of support materials. Thus, for example, a zeolite and an alumina can be blended together as a support material in varying proportions which support materials contain various metals deposited thereon.

Typical examples of cracking catalysts are the well-known commercial varieties, e.g., Davison XZ–25, Aerocat Triple S–4, Nalcat KSF, Houdry HZ–1, etc. These catalysts are made up of a silica-alumina-zeolite base in particle sizes usually within a size range of one thirty-second to three-eighths inch, suitably one-sixteenth to one-eighth inch, and containing rare earth metal oxides.

Typical compositions of the catalysts are the following. Davison XZ–25, a product of Davison Chemical Company, is mixed silica-alumina-zeolite cracking catalyst containing about 30–35 weight percent alumina, 18 weight percent zeolite X, and about 2 weight percent cerium and 1 weight percent lanthanum. Aerocat Triple S–4, a product of American Cyanamid Company, is a silica-alumina-zeolite cracking catalyst containing about 32 weight percent alumina, 3 weight percent zeolite Y, 0.5 weight percent cerium and 0.1 weight percent lanthanum. Nalcat KSF, a product of Nalco Chemical Co., is a silica-alumina-zeolite cracking catalyst containing about 31–35 weight percent alumina, 11 percent zeolite X, about 1 percent cerium and 0.3 percent lanthanum.

The process of this invention is particularly adaptable to hydrogenation processes and, more particularly, for the hydrogenation of, for example, lubricating viscosity petroleum fractions to white mineral oils and solvent dewaxed raffinate mineral oil derived from crude oil having a characterization factor of at least 11.5. In carrying out a preferred hydrogenation process, two stages are utilized, the first stage using a sulfur-resistant hydrogenation catalyst in the presence of hydrogen followed by a second stage treatment of this product with a platinum group metal-alumina catalyst in the presence of hydrogen.

The hydrorefining treatment in the first stage is generally conducted at temperatures of about 600° to 775° F., pressures of about 1,500 to 5,000 p.s.i.g., weight hourly space velocities (WHSV) of about 0.1 to 0.5, and a hydrogen rate of about 1,000 to 5,000 s.c.f./b. When it is desired to conduct the hydrorefining treatment to produce a technical grade oil, preferred operating conditions are temperatures of about 600° to 700° F., about 1,500 to 3,000 p.s.i.g. pressure, a WHSV of about 0.2 to 0.5, and hydrogen flow rate of about 1,000 to 3,000 s.c.f./b. Preferred conditions for producing a food grade oil, on the other hand, are temperatures of about 650° to 725°

F. pressures of about 2,200 to 5,000 p.s.i.g., a WHSV of about 0.15 to 0.35, and hydrogen rates of about 1,500 to 5,000 s.c.f./b.

The hydrogenated oil from the first hydrorefining stage is then subjected to less severe hydrogenation conditions, for example, at temperatures of about 450 (or of about 650° to 750° F., pressures of about 2,200 to 5,000 p.s.i.g., WHSV of about 0.15 or even about 0.25) to 0.75, and a hydrogen feed rate of about 500 to 5,000 s.c.f./b. To provide the less severe reaction conditions, the average temperature of the second stage hydrogenation is at least about 50, preferably at least about 75° F., less than the first hydrogenation stage. The preferred range of conditions for technical grade oil production are temperatures of about 525° to 650° F., pressures of about 1,000 to 3,000 p.s.i.g., WHSV of about 0.25 to 0.5, and hydrogen flow rates of about 500 to 3,000 s.c.f./b. When the process is operated to produce a food grade oil, the preferred conditions are temperatures of about 450° (or about 500°) to 625° F., pressures of about 2,000 to 5,000 p.s.i.g., WHSV of about 0.15 (or even about 0.25) to 0.35, and hydrogen flow rates of about 1,500 to 5,000 s.c.f./b.

The catalyst of the first hydrogenation operation can be of any of the sulfur resistant non-precious metal hydrogenation catalysts, some of which are conventionally employed in the hydrogenation of heavy petroleum oils. Examples of suitable catalytic ingredients are tin, vanadium, members of Group VI-B in the Periodic Table, i.e., chromium, molybdenum and tungsten and metals of the iron group, i.e., iron, cobalt and nickel. These metals are often present in catalytically effective amounts, for instance, about 2 to 30 weight percent, and may be present in the form of oxides, sulfides, or other form. Mixtures of materials can be employed, for example, mixtures or compounds of the iron group metal oxides or sulfides with the oxides or sulfides of Group VI-B constitute very satisfactory catalysts. Examples of such mixtures or compounds are nickel molybdate, tungstate, or chromate (or thiomolybdate, thiotungstate or thiochromate) or mixtures of nickel or cobalt oxides with molybdenum, tungsten or chromium oxides. As the art is aware these catalytic ingredients are generally employed while disposed on a suitable carrier of the solid oxide refractory type, e.g., a predominantly calcined or activated alumina. Commonly employed catalysts have about 1 to 10 percent of an iron group metal and 5 to 25 percent of a Group VI-B metal (calculated as the oxide). Advantageously, the catalyst is cobalt molybdate or nickel molybdate supported on alumina. Such preferred catalysts can be prepared by the method described in U.S. Pat. No. 2,938,002.

As aforementioned, the catalyst of the second hydrogenation operation is a platinum group metal-promoted catalyst. This catalyst is to be distinguished from the catalysts of the first hydrogenation in that it is not normally considered to be sulfur-resistant. The catalyst includes catalytically effective amounts of the platinum group metals of Group VIII, for instance platinum, palladium, rhodium or iridium, which are present in catalytically effective amounts, generally in the range of about 0.01 to 2 weight percent, preferably about 0.1 to 1 weight percent. The platinum group metal may be present in the metallic form or as a sulfide, oxide or other combined form. The metal may interact with other constituents of the catalyst but if during use the platinum group metal is present in metallic form, then it is preferred that it be so finely divided that it is not detectable by X-ray diffraction means, i.e., that it exists as crystallites of less than about 50 A. size. Of the platinum group metals, platinum is preferred. If desired, the catalysts of the first and second hydrogenations can be hydrogen purged or prereduced prior to use by heating in the presence of hydrogen, generally at temperatures of about 300° to 600° F. for purging or at about 600° to 800° F. for prereduction.

Although various solid refractory type carriers known in the art may be utilized as a support for the platinum group metal, the preferred support is composed predominantly of alumina of the activated or calcined type. The alumina base is usually the major component of the catalyst, generally constituting at least about 75 weight percent on the basis of the catalyst and preferably at least about 85 to 99.8 percent. The alumina catalyst base can be an activated or gamma-alumina, alumina monohydrate, alumina trihydrate or their mixtures. A catalyst base advantageously used is a mixture predominating in, or containing a major proportion of, for instance about 65 to 95 weight percent of one or more of the alumina trihydrates, a bayerite I, nordstrandite or gibbonite, and about 5 to 35 weight percent of alumina monohydrate (boehmite), amorphous hydrous alumina or their mixtures. The alumina base can contain small amounts of other solid oxides such as silica, magnesia, natural or activated clays (such as kaolinite, montmorillonite, halloysite, etc.), titania zirconia, etc., or their mixtures.

The invention can be better appreciated by the following non-limiting examples.

EXAMPLE I

To a vertically mounted 4-inch diameter steel cylinder having a length of 40 feet and equipped with a catalyst collector, was charged a prescreened 1/16-inch extruded nickel molybdenum catalyst. The catalyst was prescreened by removing the fines by passing the catalyst through a U.S. Standard 20 mesh screen.

The catalyst was allowed to free fall over the cross section area of the cylinder at a rate of 3 inches per minute with a free fall distance varying from about 40 to about 39 feet with uniform distribution of the catalyst particles during the formation of the catalyst bed. A total of 2,400 grams of catalyst was added to the cylinder. After the addition of catalyst the weight percent fines produced was determined by screening the catalyst through a 20 mesh screen. The weight percent fines was determined to be 0.38.

Utilizing the same steel cylinder and the same prescreened catalyst, the catalyst was allowed to flow in a continuous solid phase through the 40-foot cylinder thereby simulating sock charging to a reactor. The weight percent fines was determined to be 0.2 percent.

EXAMPLE II

Utilizing an 18-inch diameter cylinder having a length of 20 feet, the catalyst of Example I is charged using a conical diverter to prepare a catalyst bed of uniform distribution. After the formation of a catalyst bed, the orientation of the catalyst particles is determined by observation to be substantially horizontal.

EXAMPLE III

In order to determine the firmness of the catalyst bed as prepared in the manner of Example II, a ¼-inch steel rod was held vertically at the catalyst surface and released. The amount of penetration was determined to be 1 inch. A second catalyst bed was prepared by the "sock" method of Example I. A ¼-inch steel rod was held vertically at the catalyst surface and released. The amount of penetration was determined to be 12 inches.

EXAMPLE IV

In the following example a steel tower having a 16-inch diameter and a 20-foot length equipped with liquid and nitrogen gas mixing and addition means at the top of the tower and sectioned collecting means consisting of nine sections at the bottom of the tower was utilized to determine the liquid flow distribution and the residence time distribution utilizing a tritium-labeled ethyl cyclohexane tracer for catalyst beds charged by various methods. The addition means at the top of the tower that was utilized in the following experiments was either a flat plate having a 16 inch diameter or a concentric pan wherein liquid flowed into the bed in two concentric circles. The collecting means at the bottom of the tower consisted of nine parts which consisted of nine compartments which are separated by 3-inch high dividers. At the bottom of each collector is placed a 1 ½-inch layer of ¼-inch alundum balls. The sectioned collector in addition contains outlet means at the bottom of each collector section for liquid recovery and the sides of the collector extend into the tower a distance such that the loaded catalyst extends about 1 ½-inch into each section. The nine sections of the collector consist of a center section (5) centered in the collector having a radius of 5 ⅞ inches. Sections Right 3, Right 4 (R3, R 4) and Left 3, Left 4 (L3, L4) are obtained by sectioning the area having a radius of from 5 7/8 inches to 13 inches which consist of approximately two sections, L3 and R3, occupying 12 1/2percent of that area and two other sections, R4 and L4, occupying about 37 1/2percent of that area. The remaining sections, Left 1, Left 2 (L1, L2) and Right 1, Right 2 (R1, R2) are obtained by sectioning on an equal area basis the remainder of the collector having a radius from 13 inches to 17 inches, e.g., the outer radius of the collector. The right and left sides of the collector, other than section 5, are formed by a divider which divides the left from the right. In order to determine the residence time distribution the liquid inlet means is adapted such that the tracer can be injected into the liquid and monitoring means to determine the amount of tracer reaching the bottom of the tower in various lengths of time. For determining the liquid distribution and residence time distribution a No. 1 fuel oil having 42° API gravity and a viscosity of 1.85 centipoise at 80° F., and a catalyst consisting of a 1/16-inch extruded nickel molybdenum catalyst having a pore volume of 0.55 ml/gram was utilized.

In the following table is set forth the results obtained for liquid distribution, residence time distribution and bulk density after the catalyst was charged to the tower by the off-center "sock" method (S), the pour-down method (P), and the processing of this invention (I).

For the off-center "sock" method the catalyst was charged from a 20 gallon hopper which was fitted with a 4-inch diameter flexible sock which was lowered into the tower and the bottom end of the hose kept in contact with the catalyst surface. The catalyst was allowed to flow slowly from the bottom of the sock at the right side of the tower, and positioned over the divider between sections R1 and R2.

In the pour-down method, a 30 gallon hopper with a 3-inch diameter shutter valve located in the bottom of the hopper was charged with catalyst and the shutter valve centered over the tower and opened. The catalyst was allowed to pour in a solid stream to the catalyst surface.

For the process of this invention, the same 20 gallon hopper utilized in the off-center sock method was fitted with a notched plastic funnel suspended on a rod through the center of the hopper. The funnel acted as a valve to shut off and/or adjust the rate of catalyst flow from the hopper and to disperse the catalyst stream over the tower diameter at a uniform rate. The catalyst was charged at a fill rate of 1 vertical in./min.

In the following table are set forth by example number the catalyst charging method, the distribution device (A) for plate, (B) for centered pan, the amount of catalyst, the liquid and gas rates and the percent of total flow by section number. The values for section flow were corrected to provide all percentages for unequal area sections on the same uniform basis, e.g., perfect distribution for each section should be 11.1 percent. The bulk densities together with the number of perfectly mixed vessels (J) in series which would be required to approximate the residence time distribution of the system are given.

The results set forth in Examples I through IV demonstrate the outstanding effectiveness of the process of this invention. More particularly, Example I demonstrates that the process of this invention can charge a catalyst while minimizing the formation of catalyst fines. The firmness of the catalyst bed (Example III) is clearly demonstrated by the penetration of the catalyst bed by the steel rod. Thus, the catalyst bed prepared by the process of this invention substantially eliminates catalyst settling problems which can result in damage to internal parts of reactors and in some cases the complete inability to monitor the temperature of reactions. Of particular importance is Example IV wherein the bulk density of the

TABLE I

| Ex. No. | Charging method | Catalyst Lbs. | Feet | Distributor | Liquid grams per minute | Gas cubic ft. per minute | Superficial velocity Liquid | Gas | $L_1$ | $L_2$ | $L_3$ | $L_4$ | 5 | $R_4$ | $R_3$ | $R_2$ | $R_1$ | Bulk density | J |
|---|---|---|---|---|---|---|---|---|---|---|---|---|---|---|---|---|---|---|---|
| 1 | S | 1,376 | 20 | A | 2.1 | 0.9 | 480 | 2.38 | 42.3 | 53.7 | 0.5 | 2.3 | 0.1 | (¹) | 0.3 | 0.7 | 0.1 | 0.68 | |
| 2 | S | 1,376 | 20 | B | 4.6 | 0.9 | 1,120 | 2.38 | 42.4 | 50.6 | 0.7 | 5.0 | (¹) | (¹) | (¹) | 1.3 | (¹) | | 0.83 |
| 3 | P | 1,376 | 20 | B | 4.6 | 0.9 | 1,120 | 2.38 | 18.5 | 17.2 | 3.2 | 3.1 | 5.1 | 4.3 | 2.4 | 22.6 | 23.6 | 0.68 | 1.08 |
| 4 | P | 1,376 | 20 | B | 2.0 | 0.4 | 480 | 1.06 | 19.3 | 18.2 | 3.2 | 3.0 | 3.5 | 3.2 | 1.7 | 23.3 | 24.6 | | |
| 5 | I | 1,376 | 16 | B | 4.6 | 0.9 | 1,120 | 2.4 | 9.0 | 7.1 | 13.2 | 10.5 | 17.1 | 12.5 | 12.8 | 8.6 | 9.2 | 0.81 | 2.52 |
| 6 | I | 1,376 | 16 | B | 1.0 | 0.2 | 220 | 0.5 | 8.1 | 8.5 | 10.9 | 10.3 | 14.2 | 11.7 | 14.6 | 11.6 | 10.1 | | 5.30 |

¹ Trace.

catalyst bed is increased by the process of this invention. More particularly, the bulk density varies from the prior art methods of sock loading and pour-down of from 0.61 to the process of this invention, 0.81. This remarkable increase in bulk density provides for greater catalyst efficiency and utilization in carrying out various processes. Thus, higher throughput of reactants can be obtained while minimizing the amount of reactor volume necessary for such throughput. In addition, the liquid distribution and residence time distribution results demonstrate that the process of this invention provides for improved liquid distribution and, therefore, more catalyst efficiency by increasing the distribution of reactants over a catalyst surface. In addition, the results of residence time distribution studies demonstrate that a more efficient catalyst bed can be produced when catalyst is charged according to the process of this invention.

While this invention has been described with respect to various specific examples and embodiments, it is to be understood that the invention is not limited thereto and that it can be variously practiced within the scope of the following claims.

We claim:

1. In a method wherein a solid catalyst is charged to a fixed bed reactor, a catalyst surface is formed as a volume of catalyst is added to the reactor to form a fixed catalyst bed, and the formed fixed bed catalyst is subjected to a catalytic conversion process, the improvement which comprises charging to the reactor in downflow relationship to said reactor, solid catalyst particles having a substantially cylindrical geometry on an average basis at a rate of fill of the reactor of up to about 17 vertical inches per minute, and at an average free fall distance of the catalyst particles through a gaseous medium to catalyst surface of at least about 1 foot, distributing the catalyst lengths in the catalyst bed in a substantially horizontal orientation on an average basis to form a fixed bed, and then subjecting the fixed catalyst bed to a catalytic hydrocarbon conversion or refining process.

2. A method of claim 1 wherein the rates of fill is from 1 to about 6 inches per minute.

3. A method of claim 2 wherein the rate of fill is from about 2 to about 4 inches per minute.

4. A method of claim 1 wherein the free fall distance is from about 5 to about 125 feet and the width of the reactor is from about 1 to about 15 feet.

5. A method of claim 2 wherein the free fall distance is from about 5 to about 125 feet and the width of the reactor is from about 1 to about 15 feet.

6. A method of claim 5 wherein the free fall distance is from about 10 to about 70 feet and the width of the reactor is from about 3 to about 13 feet.

7. A method of claim 1 wherein the catalyst particles have a diameter of from about 1/32 of an inch to about 1/4 of an inch.

8. A method of claim 5 wherein the catalyst particles have a diameter of from about one thirty-second of an inch to about one fourth of an inch and the catalyst particles are selected from the group consisting of an oxidation catalyst, a hydrodesulfurization catalyst, a hydrocracking catalyst, a cracking catalyst, a reforming catalyst, and a hydrogenation catalyst.

9. A method of claim 8 wherein the catalyst particles have a diameter of from about one-sixteenth sixteenth of an inch to about one-eighth of an inch, and the catalyst particles are selected from the group consisting of a hydrodesulfurization catalyst, a hydrocracking catalyst, a reforming catalyst, and a hydrogenation catalyst.

10. A method of claim 1 wherein the length over diameter of the catalyst particles is from about 1.5 to about 6.

11. A method of claim 7 wherein the length over diameter of the catalyst particles is from about 1.5 to about 6.

12. A method of claim 8 wherein the length over diameter of the catalyst particles is from about 1.5 to about 6.

13. A method of claim 8 wherein the length over diameter of the catalyst particle is from about 2 to 5.

14. A method for increasing the bulk density of a fixed catalyst bed per unit volume of a reactor which comprises charging to the reactor in downflow relationship to said reactor, solid catalyst particles having a substantially cylindrical geometry on an average basis at a rate of fill of the reactor of up to about 17 vertical inches per minute, and at an average free fall distance of the catalyst particles through a gaseous medium to catalyst surface of at least about 1 foot, distributing the catalyst lengths in the catalyst bed in a substantially horizontal orientation on an average basis to form a fixed bed, and then subjecting the fixed catalyst bed to a catalytic hydrocarbon conversion or refining process.

15. A method of claim 14 wherein the rate of fill is from 1 to about 6 inches per minute.

16. A method of claim 14 wherein the free fall distance is from about 5 to 125 feet and the width of the reactor is from about 1 to about 15 feet.

17. A method of claim 16 wherein the catalyst particles have a diameter from about one thirty-second of an inch to about one-fourth of an inch and the catalyst particles are selected from the group consisting of an oxidation catalyst, a hydrodesulfurization catalyst, a hydrocracking catalyst, a cracking catalyst, a reforming catalyst, and a hydrogenation catalyst.

18. A method of claim 17 wherein the length over diameter of the catalyst particle is from about 1.5 to about 6 1and the catalyst particle is selected from the group consisting of a hydrogenation catalyst, a hydrodesulfurization catalyst, a hydrocracking catalyst and a reforming catalyst.

19. In a hydrogenation process wherein a hydrogenation catalyst is charged to a hydrogenation fixed bed reactor, a feedstock comprising hydrogen and a hydrogenateable organic material are contacted with said hydrogenation catalyst and a hydrogenated organic material is recovered, the improvement which comprises charging to the reactor in downflow relationship to said reactor, solid catalyst particles having a substantially cylindrical geometry on an average basis at a rate of fill of the reactor of up to about 17 vertical inches per minute, and at an average free fall distance of the catalyst particles through a gaseous medium to catalyst surface of at least about 1 foot, distributing the catalyst lengths in the catalyst bed in a substantially horizontal orientation to form said fixed bed, and then contacting said fixed bed with said feedstock.

20. A method of claim 19 wherein the rate of fill is from about 1 to about 6 inches per minute.

21. A method of claim 19 wherein the free fall distance is from about 5 to about 125 feet and the width of the reactor is from about 1 to about 15 feet.

22. A method of claim 21 wherein the free fall distance is from about 10 to about 70 and the width of the reactor is from about 3 to about 13 feet.

23. A method of claim 21 wherein the catalyst particles have a diameter of from about one thirty-second of an inch to about one-fourth of an inch and the length over diameter is from about 1.5 to about 6.

24. A method of claim 22 wherein the catalyst particles have a diameter of from about one thirty-second of an inch to about one-fourth of an inch and the length over diameter is from about 1.5 to about 6.

* * * * *

PO-1050
(5/69)

UNITED STATES PATENT OFFICE
CERTIFICATE OF CORRECTION

Patent No. 3,668,115      Dated June 6, 1972

Inventor(s) George Uhl and Lloyd A. Baillie

It is certified that error appears in the above-identified patent and that said Letters Patent are hereby corrected as shown below:

Column 8, line 66; delete "rates" and insert in place thereof ---rate---.

Column 9, line 15; delete "sixteenth" (second occurrence).

Column 9, line 27; before the number 5, insert ---about---.

Column 10, line 8; delete "land" and insert in place thereof ---and---.

Signed and sealed this 29th day of August 1972.

(SEAL)
Attest:

EDWARD M. FLETCHER, JR.
Attesting Officer

ROBERT GOTTSCHALK
Commissioner of Patents